Figure 1:
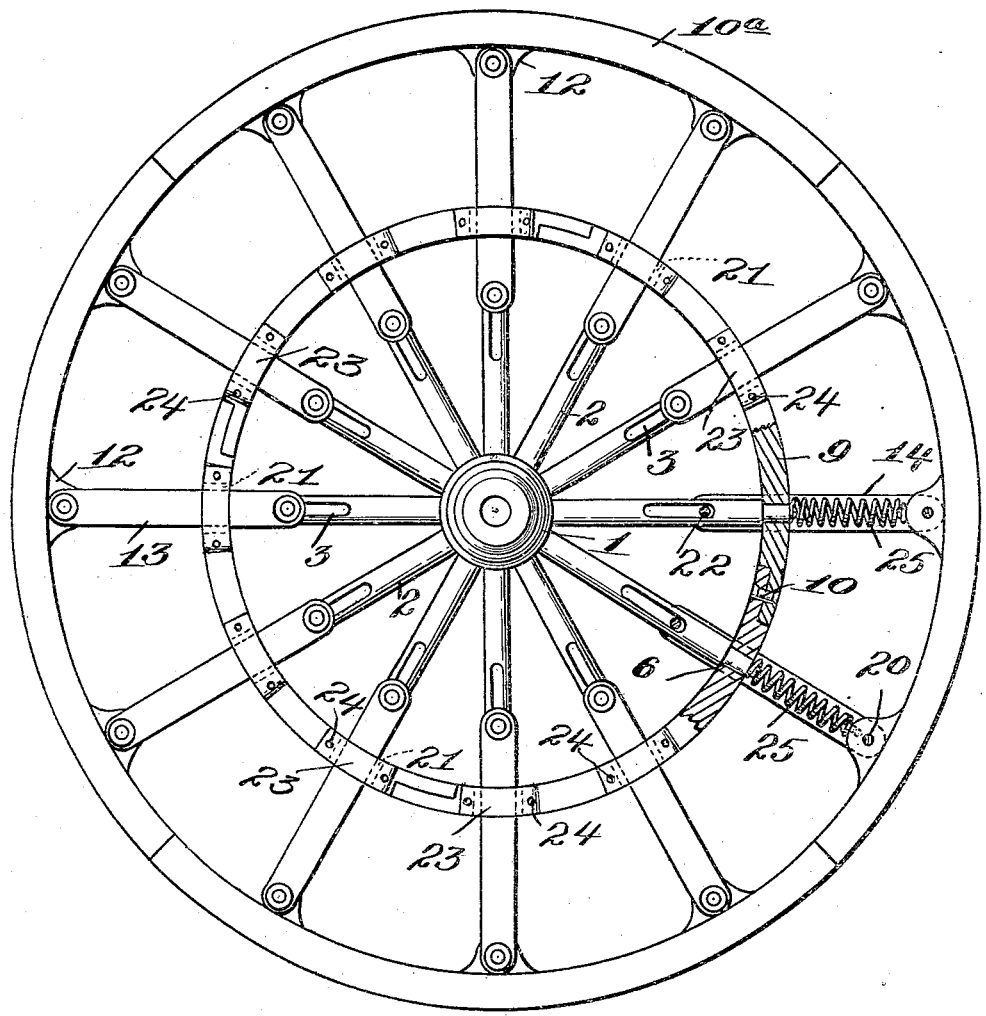

C. L. SHAW.
VEHICLE WHEEL.
APPLICATION FILED JULY 10, 1907.

931,505.

Patented Aug. 17, 1909.

2 SHEETS—SHEET 1.

Witnesses

Inventor
Clarence L. Shaw

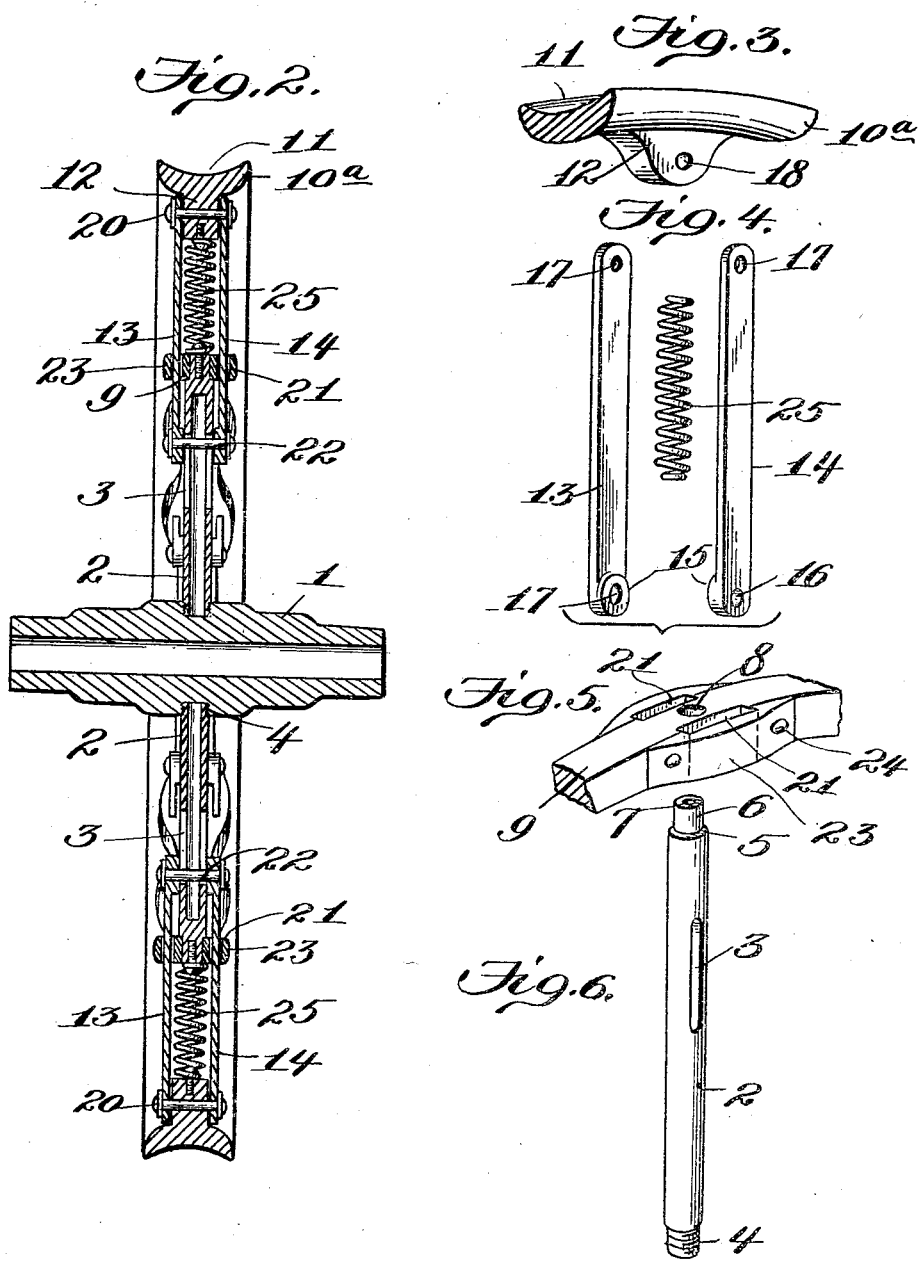

UNITED STATES PATENT OFFICE.

CLARENCE L. SHAW, OF CASA GRANDE, ARIZONA TERRITORY.

VEHICLE-WHEEL.

No. 931,505.  Specification of Letters Patent.  Patented Aug. 17, 1909.

Application filed July 10, 1907. Serial No. 383,071.

*To all whom it may concern:*

Be it known that I, CLARENCE L. SHAW, a citizen of the United States, residing at Casa Grande, in the county of Pinal and Territory of Arizona, have invented new and useful Improvements in Vehicle-Wheels, of which the following is a specification.

This invention relates to vehicle wheels of that class having a yielding outer rim whereby vibrations will be taken up, and the object thereof is to provide a vehicle wheel of such class in a manner as hereinafter set forth with a cushioning means other than a pneumatic one, and by such construction all the advantages of a pneumatic tired wheel are obtained and at the same time the durability of the wheel is enhanced.

A further object of the invention is to provide a cushioned vehicle wheel in a manner as hereinafter set forth having a solid rubber or other suitable tire and which may be used with the same degree of comfort as that now derived from a pneumatic tired wheel, thereby decreasing the cost of the wheel with respect to the cost of a pneumatic tired wheel.

A further object of the invention is to provide a cushioned vehicle wheel in a manner as hereinafter set forth, which shall be simple in its construction, strong, durable, efficient in its use, possessing the same advantages as a pneumatic tired wheel, readily set up, allowing for the convenient duplication of any injured part, and comparatively inexpensive to manufacture.

With the foregoing and other objects in view, the invention consists in the novel construction, combination and arrangement of parts hereinafter more specifically described and illustrated in the accompanying drawings, wherein is shown the preferred embodiment of the invention, but it is understood that changes, variations and modifications can be resorted to which come within the scope of the claims hereunto appended.

In describing the invention in detail, reference is had to the accompanying drawings, wherein like reference characters denote corresponding parts throughout the several views, and in which:—

Figure 1 is a side elevation partly in section of a vehicle wheel in accordance with this invention. Fig. 2 is a vertical sectional view. Fig. 3 is a detail of the outer rim. Fig. 4 is a detail showing a pair of outer spokes and one of the cushioning members. Fig. 5 is a detail on the same scale as Fig. 4 of a portion of the inner rim, and Fig. 6 is a perspective view on the same scale as Figs. 4 and 5 of one of the inner spokes.

Referring to the drawings, 1 denotes the hub of the wheel in which are secured the inner spokes 2. Each of the inner spokes 2 consists of a tubular member having an elongated vertically extending slot 3 intermediate the ends thereof and further having one end screw-threaded as at 4, which is adapted to engage in the hub 2. The other end of the spoke 2 is formed with a shoulder 5 and a protuberance 6, the latter having a reces s7. The protuberances 6 and spokes 2 are adapted to engage in the openings 8 formed in the inner rim 9. The latter consists of a plurality of segments which have their ends overlapping each other and connected together as at 10. When the protuberances 6 are positioned in the openings 8, the shoulders 5 abut against the inner face of the rim 9. The length of the protuberances 6 is such so as to have the outer end of each protuberance flush with the outer face of the rim 9. By such construction, the inner rim 9 is connected with the hub 1 by the spokes 2 so as to revolve therewith.

The outer rim of the wheel is indicated by the reference character $10^a$ and is formed of a plurality of segments suitably secured together. The outer face of the rim $10^a$ is channeled as at 11, in which is secured any suitable construction of tire. The inner face of the outer rim 11 is formed with a plurality of inwardly extending apertured lugs 12, to each of which is pivotally connected one of the outer spokes of the wheel. Each of the outer spokes is formed of two members 13, 14, the inner end of which is enlarged as at 15 and apertured as at 16. The other end of each of the members is apertured as at 17. The apertures 17 are positioned to register with the openings 18 formed in the lugs 12. The members 13 and 14 are positioned at each side of the lugs 12 and are pivotally connected thereto by the bolts 20, best shown in Fig. 2. The members 13, 14 are arranged at each side of the inner rim 9, grooves 21 being provided in the rim 9 to receive them. The grooves 21 are larger than a cross section of the members 13 and 14. The inner ends of the members 13, 14 extend at the side of the spokes 2 and are connected thereto through the medium of the pins 22 which extend through the openings 16 and elongated slots 3 and by such an arrangement, the outer spokes are slidably connected to the inner spokes. The members 13, 14 are held in engagement with the inner rim 9 through the medium of the keepers 23 which are secured to the sides of the rim 9 by the hold-fast devices 24. The keepers 23 prevent any lateral play of the members 13, 14.

Interposed between the outer rim 10 and the inner rim 9 is a plurality of cushioning springs 25. These latter are arranged one between each of the members forming an outer spoke and the upper end of each of the springs 25 is connected to a lug 12 while its lower end is connected in a recess 7 of a protuberance 6. Owing to the manner in which the cushioning springs 25 are set up, it is evident that when the outer rim meets with an obstruction or travels over an uneven road bed, the shifting movement of the outer rim will be cushioned and thereby will overcome jarring or jolting. The disposition of the springs 25 in the manner as set forth obtains the same function as a pneumatic tired wheel, as it enables the outer rim to yield in coming in contact with rough or uneven surfaces, thereby taking up the vibrations which would otherwise come upon the vehicle mounted upon the wheels.

A further advantage of setting up a wheel in a manner as hereinbefore set forth is that the wheel can be manufactured larger in diameter and have greater tire travel than the ordinary wheel, without the axle of the vehicle being any greater distance from the ground. By way of example, in this connection, it will be stated that should the center of the axle of the wheel be fourteen inches from the outer edge of the tire and a wheel in accordance with this invention be substituted, having the same diameter as the ordinary wheel, but with a spring compression of say one inch with the ordinary weight of the vehicle, then the axle would be shifted downward one inch, leaving the axle only thirteen inches from the ground, but leaving the diameter of the outer rim unchanged. Therefore, a vehicle in accordance with this invention with a spring compression of one inch can be made two inches greater in diameter than the ordinary wheel while the center of gravity remains the same. In like manner the diameter can be increased or decreased according to the compression of the springs made to suit a certain weight of vehicle.

A further advantage of a wheel in accordance with this invention is that in case of breakage of any parts, duplicate parts can be obtained and the damage repaired at small cost and by any one of ordinary intelligence.

What I claim is:—

1. A vehicle wheel comprising an inner rim, inner spokes carrying said rim, an outer rim, cushioning means interposed between the inner and outer rims, and outer spokes pivotally connected to the outer rim and pivotally and slidably connected to the inner spokes.

2. A vehicle wheel comprising an inner rim, inner spokes carrying said inner rim, an outer rim, cushioning means connected to the outer rim and the inner spokes, outer spokes pivotally connected to the outer rim and pivotally and slidably connected to the inner spokes, and means connected to the inner rim to prevent lateral displacement of the outer spokes.

3. A vehicle wheel comprising an inner rim, inner spokes carrying said rim, an outer rim provided with a plurality of inwardly extending lugs, cushioning members connected at one end to said lugs and at the other end to said inner spokes, and outer spokes pivotally connected to said lugs and pivotally and slidably connected to said inner spokes.

4. A vehicle wheel comprising an inner rim, inner spokes carrying said rim, an outer rim provided with a plurality of inwardly extending lugs, cushioning members connected at one end to said lugs and at the other end to said inner spokes, outer spokes pivotally connected to said lugs and pivotally and slidably connected to said inner spokes, and means connected to the inner rim to prevent lateral displacement of the outer spokes.

5. A vehicle wheel comprising a plurality of inner spokes, each formed with an elongated slot, an inner rim carried by said spokes, an outer rim having a plurality of inwardly extending lugs, outer spokes pivotally connected to said lugs and extending through said inner rim, means extending through the slots in the inner spokes and connected to the inner ends of the outer spokes for pivotally and slidably connecting said outer spokes to said inner spokes, and cushioning members connected to the lugs and to the inner spokes.

6. A vehicle wheel comprising an inner rim, inner spokes carrying said rim, an outer rim, cushioning members interposed between the outer rim and the inner rim, and outer spokes pivotally connected to the outer rim, extending through the inner rim and pivotally and slidably connected to the inner spokes.

7. A vehicle wheel comprising inner and outer spokes, an outer rim, means for pivotally connecting the outer spokes and the outer rim, means for pivotally and slidably connecting the outer spokes to the inner spokes, and cushioning elements connected to the outer rim and to the inner spokes.

8. A vehicle wheel comprising an outer rim, outer spokes each formed of two members, means for pivotally connecting the outer spokes to said rim, inner spokes, means for pivotally and slidably connecting the outer spokes to the inner spokes, and a cushioning element arranged between the members forming each of the outer spokes, said element connected to the rim and to the inner spokes.

9. A vehicle wheel comprising a plurality of inner spokes, an inner rim carried thereby, a plurality of outer spokes each formed of two members, means for pivotally connecting the outer spokes to the outer rim, means for pivotally and slidably connecting the outer spokes to the inner spokes, and a cushioning element arranged between the members forming each of the outer spokes, said cushioning element connected at one end to the outer rim and at the other end to the inner spokes.

10. A vehicle wheel comprising a plurality of inner spokes, an inner rim carried thereby, a plurality of outer spokes each formed of two members, means for pivotally connecting the outer spokes to the outer rim, means for pivotally and slidably connecting the outer spokes to the inner spokes, a cushioning element arranged between the members forming each of the outer spokes, said cushioning element connected at one end to the outer rim and at the other end to the inner spokes, and means connected to the inner rim to prevent lateral displacement of the members forming the outer spokes.

In testimony whereof I have hereunto set my hand in presence of two subscribing witnesses.

CLARENCE L. SHAW.

Witnesses:
  W. E. WEAVER,
  A. C. TORBACH.